(12) United States Patent
Dower et al.

(10) Patent No.: US 7,304,242 B1
(45) Date of Patent: Dec. 4, 2007

(54) SHRINKABLE CLOSURE

(75) Inventors: William V. Dower, Austin, TX (US); Garry L. Sjolander, Pflugerville, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/422,685

(22) Filed: Jun. 7, 2006

(51) Int. Cl.
  *H02G 15/02* (2006.01)
(52) U.S. Cl. .................. 174/74 R; 174/77 R; 174/82
(58) Field of Classification Search ............... 174/36, 174/DIG. 8, 74 R, 75 R, 75 C, 77 R, 84 R; 428/35.1–7, 36.8–92; 138/103
  See application file for complete search history.

(56) References Cited

U.S. PATENT DOCUMENTS

| | | | | |
|---|---|---|---|---|
| 3,515,798 A | * | 6/1970 | Sievert | ......................... 174/135 |
| 3,545,773 A | | 12/1970 | Smith et al. | |
| 3,676,387 A | | 7/1972 | Lindlof | |
| 3,678,174 A | * | 7/1972 | Ganzhorn | ................. 174/84 R |
| 3,827,999 A | | 8/1974 | Crossland | |
| 3,935,373 A | | 1/1976 | Smith et al. | |
| 3,992,569 A | | 11/1976 | Hankins et al. | |
| 4,256,920 A | * | 3/1981 | Ayres et al. | ................. 174/667 |
| 4,308,416 A | | 12/1981 | Herman et al. | |
| 4,343,844 A | * | 8/1982 | Thayer et al. | .............. 428/34.9 |
| 4,464,425 A | * | 8/1984 | Voigt et al. | ................. 428/34.9 |
| 4,504,699 A | * | 3/1985 | Dones et al. | .............. 174/84 R |
| 4,550,056 A | | 10/1985 | Pickwell et al. | |
| 4,569,868 A | * | 2/1986 | De Blauwe et al. | ....... 428/35.1 |
| 4,742,184 A | * | 5/1988 | Courty et al. | ............... 174/73.1 |
| 4,798,853 A | | 1/1989 | Handlin, Jr. | |
| 4,849,580 A | | 7/1989 | Reuter | |
| 4,857,563 A | | 8/1989 | Croft et al. | |
| 4,859,809 A | | 8/1989 | Jervis | |
| 4,877,943 A | * | 10/1989 | Oiwa | ......................... 219/538 |
| 4,902,855 A | | 2/1990 | Smith | |
| 4,915,990 A | * | 4/1990 | Chang | ....................... 428/34.9 |
| 4,942,270 A | | 7/1990 | Gamarra | |
| 4,943,685 A | | 7/1990 | Reynaert | |
| 4,990,380 A | * | 2/1991 | Jensen et al. | .............. 428/34.9 |
| 5,313,019 A | | 5/1994 | Brusselmans et al. | |
| 5,439,031 A | * | 8/1995 | Steele et al. | .................. 138/89 |

(Continued)

FOREIGN PATENT DOCUMENTS

DE   1813201   7/1970

(Continued)

OTHER PUBLICATIONS

Product Literature: "BLACK-JACK™ and 50-Pair Cable Closures with Water-Block Sealing System for Direct Buried Spliced Cables," *Preformed Line Products (PLP)*, (2000), 2 pages.
Product Literature: "Ranger SERVISEAL® Closure, Super SERVISEAL® Closure," *Preformed Line Products (PLP)*, (2002), 2 pages.

*Primary Examiner*—William H. Mayo, III
(74) *Attorney, Agent, or Firm*—Gregg H. Rosenblatt

(57) ABSTRACT

A tubular housing is provided having an open face and a circumferential perimeter portion adjacent the open face of the housing. An elastomeric film can be mounted on the circumferential perimeter portion of the tubular housing across the open face of the tubular housing. The elastomeric film can be adapted to interface one or more cables when the cables are positioned within the housing to seal the cables from environmental conditions.

21 Claims, 3 Drawing Sheets

U.S. PATENT DOCUMENTS

| | | | |
|---|---|---|---|
| 5,574,257 A | 11/1996 | Brauer et al. | |
| 5,606,148 A * | 2/1997 | Escherich et al. | 174/88 R |
| 5,688,601 A | 11/1997 | Usifer et al. | |
| 5,753,861 A * | 5/1998 | Hansen et al. | 174/93 |
| 5,883,333 A | 3/1999 | Wambeke et al. | |
| 6,103,317 A | 8/2000 | Asai et al. | |
| 6,103,975 A * | 8/2000 | Krabs et al. | 174/74 A |
| 6,169,160 B1 | 1/2001 | MacQueen et al. | |
| 6,169,250 B1 | 1/2001 | Bolcato | |
| 6,248,953 B1 | 6/2001 | Miller | |
| 6,284,976 B1 | 9/2001 | Pulido et al. | |
| 6,359,226 B1 * | 3/2002 | Biddell et al. | 174/74 A |
| 6,403,889 B1 * | 6/2002 | Mehan et al. | 174/120 R |
| 6,407,338 B1 | 6/2002 | Smith | |
| 6,730,847 B1 * | 5/2004 | Fitzgerald et al. | 174/77 R |
| 2004/0065457 A1 | 4/2004 | Hager et al. | |
| 2006/0037687 A1 * | 2/2006 | Buekers et al. | 156/53 |

FOREIGN PATENT DOCUMENTS

| | | | |
|---|---|---|---|
| EP | 0 530 952 A | * | 3/1993 |
| EP | 0 750 381 A | * | 6/1995 |
| EP | 0 780 949 A | * | 12/1995 |

* cited by examiner

SHRINKABLE CLOSURE

BACKGROUND

Closure housings have been used in the telecommunications industry and electrical utilities industry for the purpose of protecting cables from outside environmental elements. Such closure housings can be installed above-ground as aerial closures, buried underground, placed in hand-holes, or mounted on poles. The outer perimeter of the closure housing provides mechanical protection from environmental elements such as rains, floods, winds, and snow, and other water or dirt particles that may harm the splice or connector.

SUMMARY

Embodiments of the invention, for example, advantageously include a tubular housing having an open face and a circumferential perimeter portion adjacent the open face of the housing. An elastomeric film can be mounted on the circumferential perimeter portion of the tubular housing across the open face of the tubular housing. The elastomeric film can be adapted to interface one or more cables when the cables are positioned within the housing to seal the cables from environmental conditions.

Also, for example, embodiments of the invention can advantageously include a tubular housing having an open face and a circumferential perimeter portion adjacent the open face of the housing. An elastomeric film can be mounted on the circumferential perimeter portion of the tubular housing across the open face of the tubular housing. One or more cables can be positioned within the housing. A first portion of each of the cables can be substantially surrounded by the elastomeric film to seal the cables from environmental conditions. A second portion of each of the cables can extend outside of the elastomeric film and the flexible tubular housing.

In operation, the invention provides improved protection and watertight sealing of one or more cables and/or joining components from harmful environmental conditions in the communications industry (such as telecommunications industry), utilities industry (such as electrical utilities industry), or other industries involving the distribution of cables and/or the transmission of optical light or electricity, seeking improved solutions regarding sealing solutions, re-enterability solutions, pressure condition solutions, space condition solutions, and weight condition solutions advantageously provided by the invention.

In one aspect of the invention, the inclusion of the elastomeric film, in combination with the shrinkable tubular housing, advantageously provides a solution for a closure housing that offers improved sealing. Further, in another aspect, the invention advantageously provides improved mechanical cable stress and strain relief based on pressure changes during periods of operation. The relatively soft surface of the elastomeric film mounted to the housing can deform to accommodate pressure changes. The compliance of the deformable layers mounted to the housing allows for significant changes in the shape of the closure while maintaining a watertight seal. The influence of pressure changes due to immersion are advantageously minimized, as compared to rendering the entire volume of the closure housing watertight.

Further, the hollow nature of the tubular housing advantageously provides increased room or space for the displacement of large cables inside the closure housing. Further, the hollow nature of the tubular housing advantageously provides a light weight solution for a closure housing, and the decrease in weight importantly allows for easier installation and transport, as well as a reduction in cost associated with the manufacture of such a closure housing.

In the past, closure housings have demonstrated problems that have not as yet been overcome in the art. Prior closure housings, and the sealing mechanism thereof, have demonstrated significant changes in shape with changing temperatures. Such changes in shape have caused loss of the seal and failure of the water and dirt particle barrier properties important to the sealing function. Prior closure housings also have presented the problem of not being easily re-enterable, which is significant in cases where cable repair or splice repair is necessary. The excess materials and heavier weight associated with prior closure housings contributed to increased waste and more difficult transport.

DETAILED DESCRIPTION

As shown in the Figures, the invention includes a tubular housing 12 having an open face and a circumferential perimeter portion 15 adjacent the open face of the housing 12. The housing 12 can be made of a shrinkable material, for example, a cold shrinkable material, a heat shrinkable material, or a crushable material, as understood by those skilled in the art. Embodiments can be configured such that at least a portion of the circumferential periphery 15 of the housing 12 is collapsible.

Figure 1:
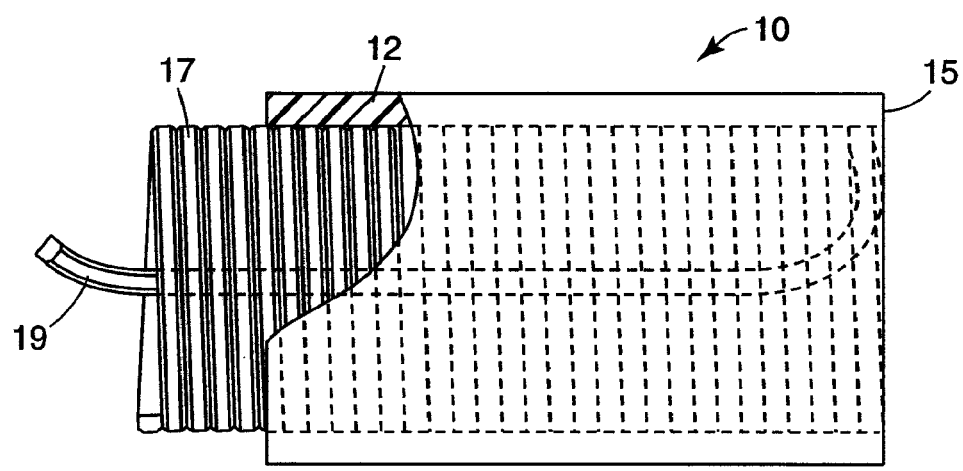
FIG. 1 is a sectional view of a housing including a shrinkable outer tube held in an extended position by a removable inner core according to an embodiment of the invention.
Figure 2:
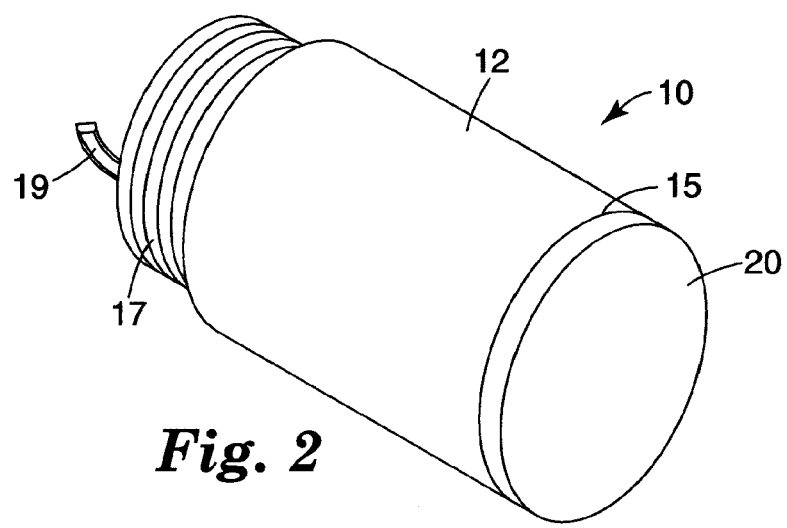
FIG. 2 is an isometric view of the housing of FIG. 1 further including an elastomeric film secured to an end portion of the tube according to an embodiment of the invention.
Figure 3:
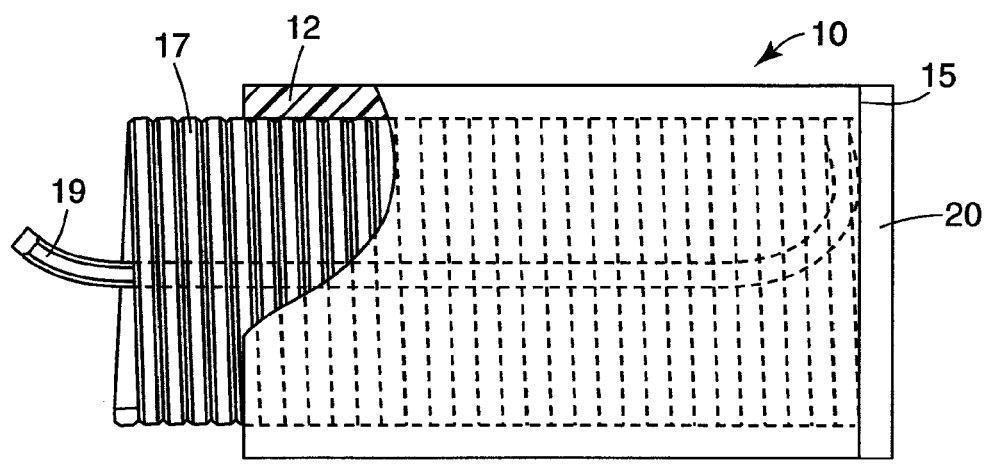
FIG. 3 is a sectional view of the housing of FIG. 2 according to an embodiment of the invention.
Figure 4:
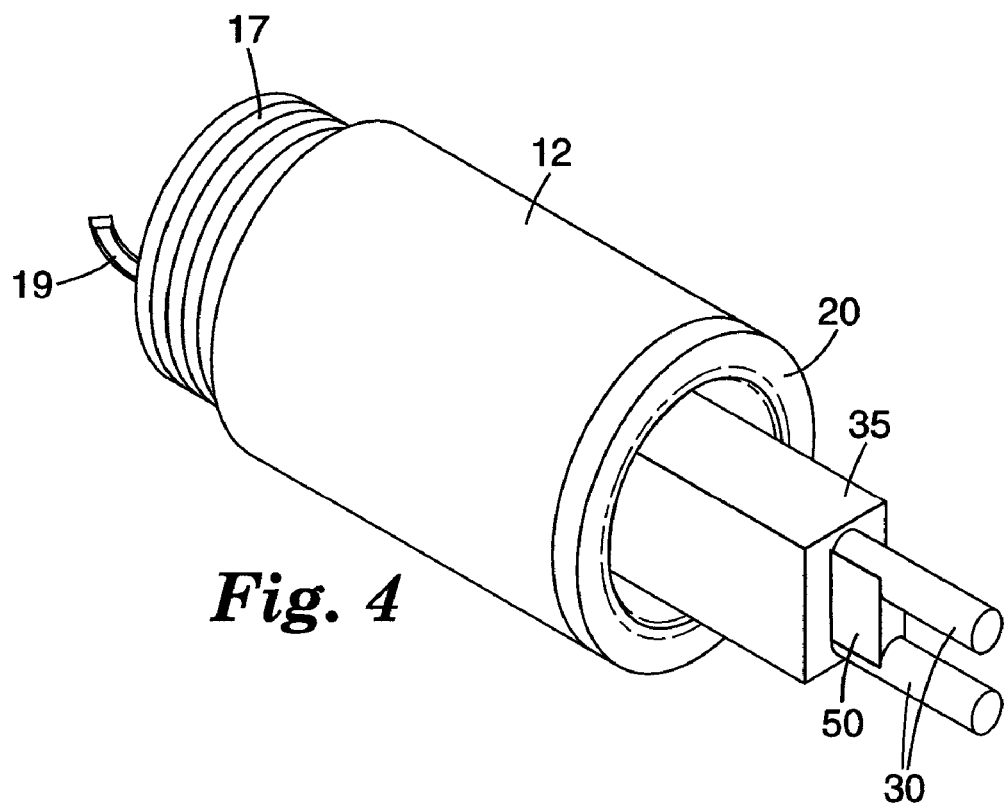
FIG. 4 is an isometric view of a closure housing including one or more cables, as the cables enter the housing, according to an embodiment of the invention.
Figure 5:
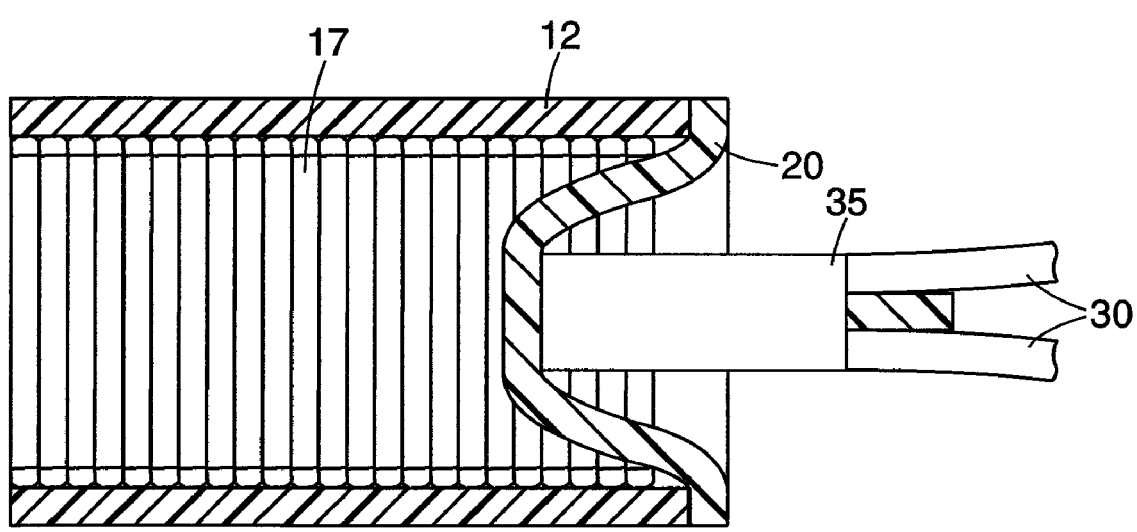
FIG. 5 is a sectional view of the closure housing of FIG. 4 according to an embodiment of the invention.
Figure 6:
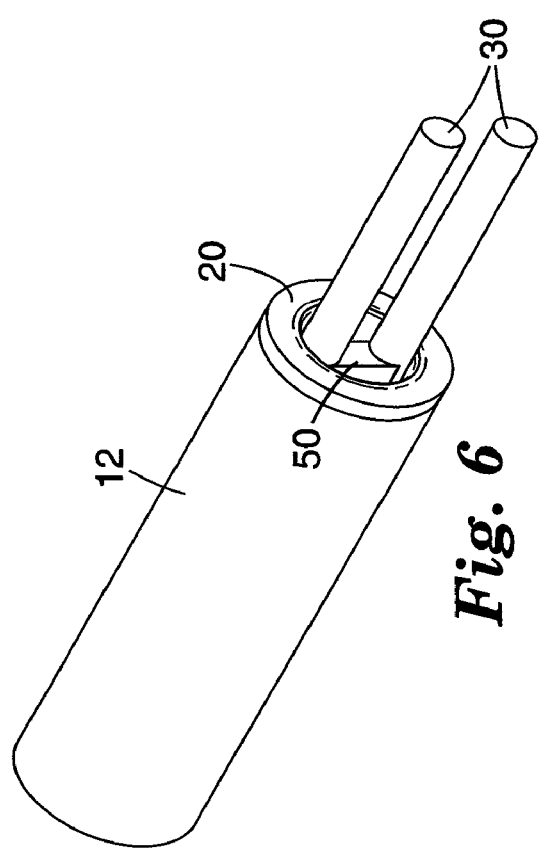
FIG. 6 is an isometric view of a closure housing similar to FIG. 4, as the cables enter the housing, according to an embodiment of the invention.

As shown in FIGS. 1-3, in one of many possible exemplary embodiments, the shrinkable material of the housing 12 can be a cold-shrinkable material held in a radially expanded state by a removable core 17 or ribbon 17, as understood by those skilled in the art of cold-shrink materials and applications. The removable core 17 is spirally wound to support the tubular housing 12, and includes a conventional pullable strand 19 understood by those skilled in the art that returns through the center portion of the spirally wound removable core 17. When the pullable strand 19 is pulled through the center portion of the removable core 17, as understood by those skilled in the art, the removable core 17 unwinds and is removed from the tubular housing 12, thereby shrinking the diameter of the tubular housing 12 as it is no longer held in a radially expanded state or otherwise supported by the removable core 17.

As shown in FIGS. 2 and 3, an elastomeric film 20 can be mounted on the circumferential perimeter portion 15 of the tubular housing 12 across the open face of the tubular housing 12. For example, the elastomeric film 20 can be mounted to the housing 12 by aligning one or more elastomeric films 20 to the tubular housing 12 in a substantially planar configuration across a circumferential perimeter 15 of the open face of each tubular housing 12, and securing the elastomeric films 20 on the tubular housing 12.

The elastomeric film 20 typically includes at least a polymer and an oil portion. Embodiments of the elastomeric film 20 can include, for example, a polymeric thermoplastic hydrophobic gel sealant including at least a portion of oil.

The properties of the polymer which make it most suited for this application are good compatibility with the oil, and rubber-like morphology, meaning flexible chains with some significant molecular flexibility between cross-linking sites. Examples of polymers that are useful can include oil-filled silicones, polyurethanes, polyesters, polyepoxys, polyacrylates, polyolefins, polysiloxanes, polybutadienes (including polyisoprenes), and hydrogenated polybutadienes and polyisoprenes, as well as copolymers, including block copolymers and graft copolymers. The blocks of the block copolymers may include the above polymers and poly (monoalkenylarenes) including polystyrene. Examples of these bock copolymers can include particularly SEBS (Styrene, ethylene-butylene, Styrene), SEPS (Styrene, ethylene-propylene, Styrene), similar Styrene-rubber-Styrene polymers, di-block, tri-block, graft- and star-block copolymers, and block copolymers with blocks which are non-homogeneous. Closed-cell foamed materials, and those incorporating microbubbles or other soft (or hard) fillers can also be included.

Embodiments of the invention can feature the elastomeric film 20 as a thermoplastic or alternatively as being cured in place. In the form of thermal cures, room temperature vulcanizable cures (RTV cures), UV-initiated cures, e-beam cures, radiation initiated cures, and cures from exposure to air and/or moisture. The elastomeric film 20 typically has greater cohesion than adhesion.

The portion of oil in the elastomeric film 20 can be, for example, in the range of about 50% to about 98% of the elastomeric film 20, or more particularly, in the range of about 85% to about 98% of the elastomeric film 20. Also, for example, embodiments of the elastomeric film 20 can include filler particles, such as polymeric spheres or glass microspheres. One example of such filler particles is deformable bubbles, where the elastomeric film 20 is formed by foaming and adding discrete bubbles. The added bubbles can be polymeric or glass microbubbles. Addition of such filler particles or bubbles allows the elastomeric film 20 to demonstrate volume compliance which will further allow conformity of the elastomeric film 20 in operation.

Embodiments of the oil can include, for example, an extender such as synthetic oils, vegetable oils, silicones, esters, hydrocarbon oils, including particularly naphthinic oils and paraffinic oils and blends, and also possibly some small percentage of aromatic oils. Some compositions within the elastomeric film 20 are intermediate between the polymer and the oil. For example, the elastomeric film 20 can include a liquid rubber which may not become part of the gel-forming polymer network. Examples of such a liquid rubber can include polybutene of moderate molecular weight, and low molecular weight EPR (Ethylene Propylene Rubber). Adding a liquid rubber to the polymer and oil can tailor the characteristics of the sealant by increasing the tack, for example. Takifiers, antioxidants, colorants, UV stabilizers, and others can be added.

Typically, the oil is advantageously hydrophobic to keep water out. Also, typically, the oil advantageously reduces the amount of chain entanglements and the number of crosslinks per volume, thereby making the material softer in the gel form. Also, typically, the oil advantageously reduces the viscosity of either the precursor (before curing) or the melted thermoplastic. Also, typically, the oil is relatively inexpensive thereby reducing the cost of the total formulation.

The elastomeric film 20 can be mounted to the tubular housing 12 in various ways. For example, a fastener can be inserted through the elastomeric film 20 when the elastomeric film 20 is mounted to the housing 12. For example, a fastener or adhesive can be used to mount the elastomeric film 20 to the housing 12. Other methods of bonding can be envisioned, including thermal and thermal compression techniques.

As shown in FIGS. 4-7, the housing 12 can be used to seal water or other environmental elements from cables 30 and/or joining components 35 inside the tubular housing 12. Embodiments of the cable 30 can include, for example, a copper or aluminum wire cable 30, a preterminated cable 30, a glass optical fiber cable 30, a polymer optical fiber cable 30, a hybrid wire and fiber optic cable 30, or any other type of cable 30 that conducts light and/or electricity.

Embodiments can include, for example, a cable 30 or series of cables 30 joined to another cable 30 or series of cables 30 within the closure via a joining component 35, or, for example, both can occur within a single closure. Each of the cables 30 passing inside the closure is configured along a direction substantially perpendicular to the plane of the open face of the tubular housing 12.

As shown in FIGS. 4-7, for example, a number of cables 30 can be connected with a joining component 35, such as a butt splice or a fold-back splice. When the joining component 35 is pressed against the elastomeric film 20 and into the tubular housing 12, the elastomeric film 20 deforms inside the tubular portion of the housing around the joining component 35 and the cables 30 to surround the joining component 35 and the cables 30.

When the removable core 17 is removed from supporting the tubular housing 12 in a radially expanded state, as understood by those skilled in the art of cold-shrinkable materials and applications, the tubular housing 12 shrinks its diameter and tightly encases the elastomeric film 20 around the joining component 35 and/or cables 30 to form a watertight seal from outside environmental conditions. A first portion of each of the cables 30, for example, can be substantially surrounded by the elastomeric film 20, and a second portion of each of the cables 30 can extend outside of the elastomeric film 20 and the tubular housing 12.

Figure 7:
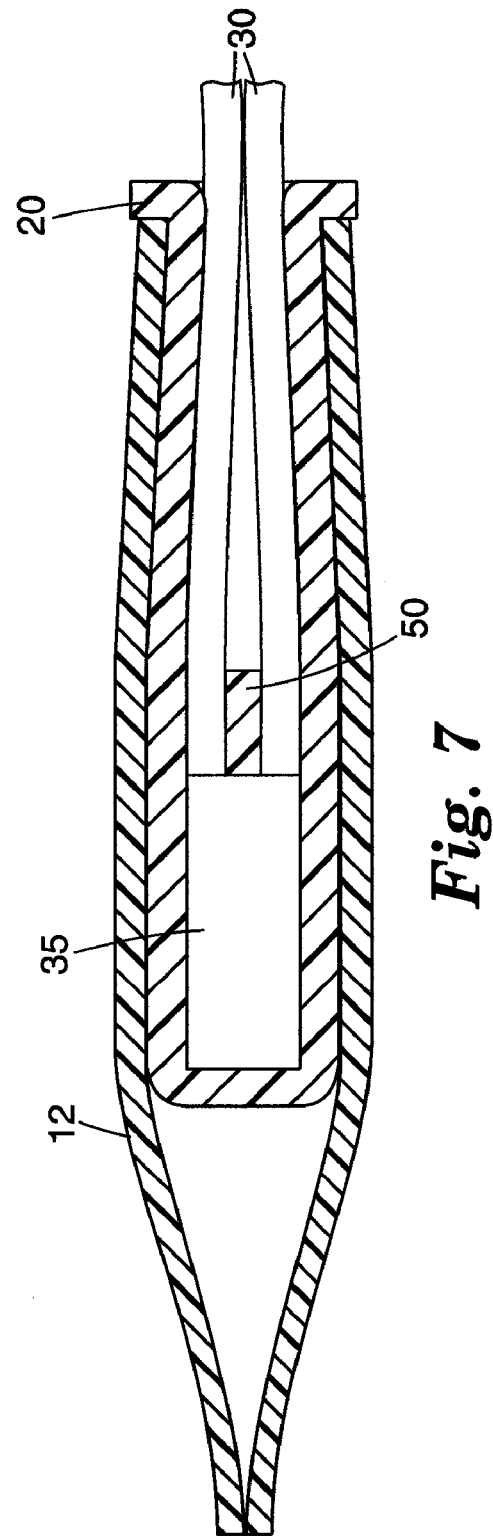
FIG. 7 is a sectional view of a sealed closure housing according to an embodiment of the invention.

As shown in FIG. 7, if more than one cable 30 is desired to enter the tubular housing 12, and if the several cables 20 are too close together, then there may be a small space which exists between the cables 30 of which the elastomeric film 20 does not fill the volume. In such a case a gel insert 50 or other conformable insert 50 can be snugly fit between the cables 30, thereby closing the volume of space between the cables 30 and sealing the cables 30 from water, dirt, or other environmental particles.

If a joining component 35 is used to join two or more cables 30, the housing 12 advantageously operates to seal not only each cable 30 run inside the closure, but also to seal the joining component 35 inside the closure from water or other environmental elements. Embodiments of the joining component 35 can include, for example, a splice such as a butt splice, or other joining component 35 having connectors therein (including discrete connectors, modular connectors, tap connectors, preterminated connector, or other connectors). Also, for example, in some applications the joining component 35 can include a termination, where the cable 30 is joined with a terminal piece of electrical or fiber optic equipment.

The joining component 35 is surrounded by the elastomeric film 20 and thereby interfaces the inner diameter of the elastomeric film 20. Embodiments of the elastomeric film 20 advantageously operate to prevent external particles and fluids from accessing the portion of the one or more joining components 35 and/or cables 30 surrounded by and interfacing the elastomeric films 20.

In operation, the invention advantageously provides improved protection and watertight sealing of one or more cables 30 and/or joining components 35 from harmful environmental conditions in the communications industry (such as telecommunications industry), utilities industry (such as electrical utilities industry), or other industry involving the distribution of cables 30 and/or the transmission of optical light or electricity, seeking improved solutions regarding sealing solutions, re-enterability solutions, pressure condition solutions, space condition solutions, and weight condition solutions advantageously provided by the invention.

The inclusion of the elastomeric film 20, in combination with the shrinkable tubular housing 12, advantageously provides a solution for a closure housing 10 that offers exceptional sealing. Further, the invention advantageously provides improved mechanical cable 30 stress and strain relief based on inevitable pressure changes during periods of operation. The relatively soft surface of the elastomeric film 20 mounted to the housing 12 can deform to accommodate pressure changes, without putting undue stress on the outer perimeter of the housing 12. The compliance of the deformable layers mounted to the housing 12 allows for significant changes in the shape of the closure while maintaining a watertight seal. The influence of pressure changes due to immersion are advantageously minimized, as compared to rendering the entire volume of the closure housing 10 watertight.

Although the aforementioned detailed description contains many specific details for purposes of illustration, anyone of ordinary skill in the art will appreciate that many variations, changes, substitutions, and alterations to the details are within the scope of the invention as claimed. Accordingly, the invention described in the detailed description is set forth without imposing any limitations on the claimed invention. The proper scope of the invention should be determined by the following claims and their appropriate legal equivalents.

The invention claimed is:

1. An apparatus comprising:
a tubular housing having an open face and a circumferential perimeter portion adjacent the open face, at least a portion of the tubular housing comprising a cold shrinkable material; and
an elastomeric film mounted on the circumferential perimeter portion of the tubular housing across the open face of the tubular housing, wherein the elastomeric film is adapted to interface one or more articles when the articles are positioned within the housing.

2. The apparatus as defined in claim 1, further comprising a support core to hold the cold shrinkable material of the tubular housing in a radially expanded state.

3. The apparatus as defined in claim 1, wherein the circumferential perimeter portion of the housing is collapsible.

4. The apparatus as defined in claim 1, wherein at least a portion of the elastomeric film comprises a polymeric thermoplastic hydrophobic composition including at least a portion of oil.

5. The apparatus as defined in claim 4, wherein the portion of oil comprises about 50% to about 98% of the elastomeric film.

6. The apparatus as defined in claim 1, wherein at least a portion of the elastomeric film includes filler particles.

7. The apparatus as defined in claim 6, wherein the filler particles comprise polymeric spheres or glass microspheres.

8. The apparatus as defined in claim 1, wherein at least a portion of the elastomeric film is an oil, and wherein at least a portion of the elastomeric film is selected from the group consisting of: a polyurethane, a polyester, a polystyrene, a polyepoxy, a polyacrylate, and a polyolefin.

9. The apparatus as defined in claim 1, wherein at least a portion of the elastomeric film comprises a copolymer of which at least a portion is selected from the group consisting of: a polyurethane, a polyester, a polystyrene, an epoxy, an acrylate, and a polyolefin.

10. The apparatus as defined in claim 1, further comprising:
one or more articles, a first portion of each of the articles substantially surrounded by the elastomeric film, and a second portion of each of the articles extending outside of the elastomeric film and the tubular housing.

11. The apparatus as defined in claim 10, wherein each of the articles is configured along a direction substantially perpendicular to the plane of the open face of the tubular housing.

12. The apparatus as defined in claim 10, wherein the one or more articles comprises two or more cables; and
further comprising a joining component that joins the cables, wherein a portion of the joining component interfaces a portion of at least one of the elastomeric films.

13. An apparatus comprising:
a tubular housing having an open face, the tubular housing having a circumferential perimeter portion adjacent the open face of the housing;
an elastomeric film mounted on the circumferential perimeter portion of the tubular housing across the open face of the tubular housing, the elastomeric film being mounted to an end portion of the tubular housing that is perpendicular to the axis of the tubular housing; and
one or more articles, a first portion of each of the articles substantially surrounded by the elastomeric film, and a second portion of each of the articles extending outside of the elastomeric film and the tubular housing.

14. A method of use comprising:
providing an apparatus comprising:
a tubular housing having an open face and a circumferential perimeter portion adjacent the open face, and
an elastomeric film mounted on the circumferential perimeter portion of the tubular housing across the open face of the tubular housing;
pressing an article against a portion of the elastomeric film;
deforming the elastomeric film responsive to elastomeric film being pressed by the article, thereby causing both the article and a portion of the elastomeric film to locate inside a portion of the tubular housing.

15. The apparatus as defined in claim 14, wherein at least a portion of the tubular housing comprises a cold shrinkable material, and further comprising:
holding the cold shrinkable material of the tubular housing in a radially expanded state with a support core that interfaces with the inner diameter of the cold shrinkable material of the tubular housing;

removing the support core from the tubular housing;

shrinking the diameter of the cold shrinkable material of the tubular housing; and encasing the elastomeric film and the tubular housing around the article.

16. The apparatus as defined in claim 14, further comprising collapsing the circumferential perimeter portion of the housing around the article when the article is located inside the housing.

17. The apparatus as defined in claim 14, wherein at least a portion of the elastomeric film comprises a polymeric thermoplastic hydrophobic composition including at least a portion of oil.

18. The apparatus as defined in claim 17, wherein the portion of oil comprises about 50% to about 98% of the elastomeric film.

19. The apparatus as defined in claim 14, wherein at least a portion of the elastomeric film includes filler particles.

20. The apparatus as defined in claim 14, wherein at least a portion of the elastomeric film is an oil, and wherein at least a portion of the elastomeric film is selected from the group consisting of: a polyurethane, a polyester, a polystyrene, a polyepoxy, a polyacrylate, and a polyolefin.

21. The apparatus as defined in claim 14, wherein at least a portion of the elastomeric film comprises a copolymer of which at least a portion is selected from the group consisting of: a polyurethane, a polyester, a polystyrene, an epoxy, an acrylate, and a polyolefin.

* * * * *